(Specimens.)
J. J. SUCKERT.
PROCESS OF PURIFYING HYDROCARBON OILS.
No. 534,295. Patented Feb. 19, 1895.
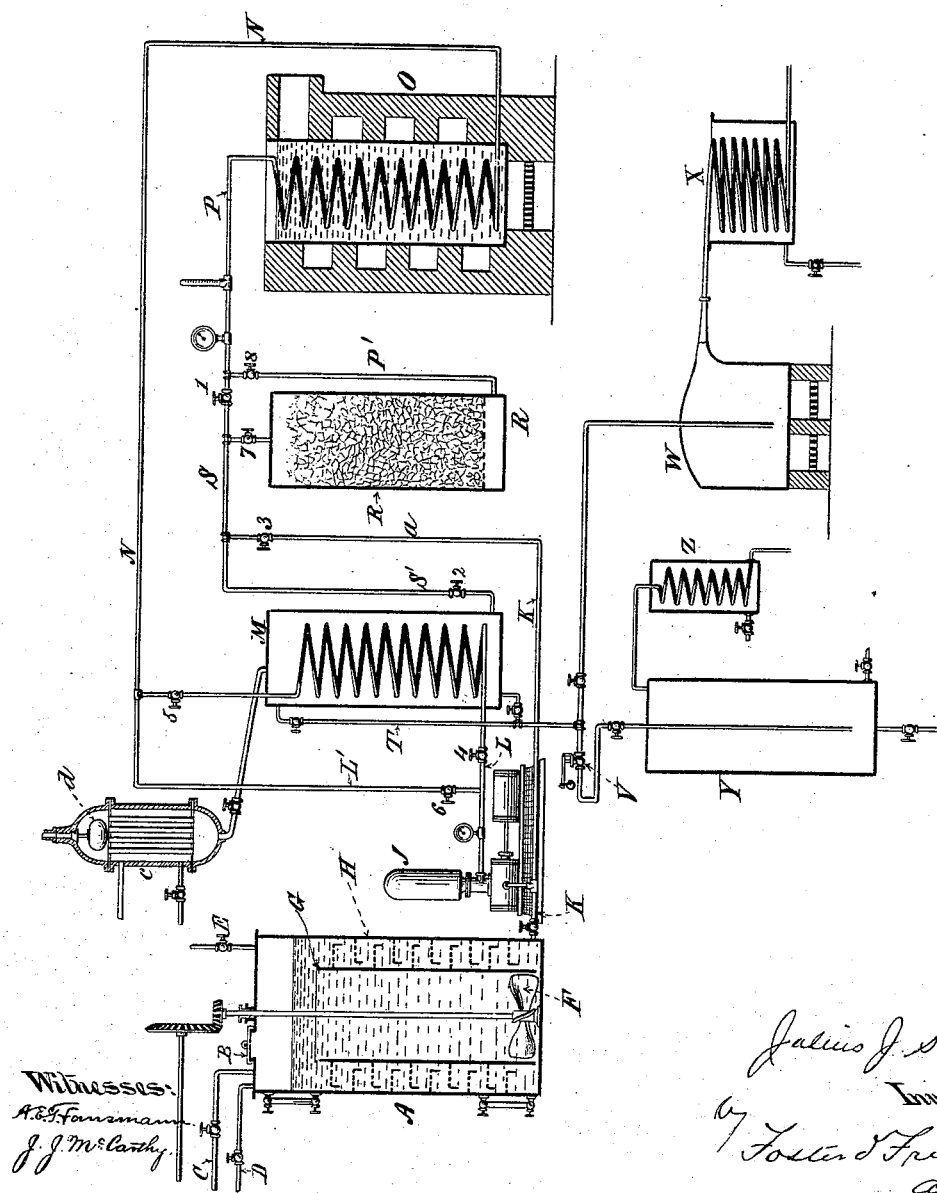

UNITED STATES PATENT OFFICE.

JULIUS J. SUCKERT, OF RIDGEWOOD, NEW JERSEY, ASSIGNOR TO HIMSELF, AND EDWARD N. DICKERSON, JR., OF NEW YORK, N. Y.

PROCESS OF PURIFYING HYDROCARBON OILS.

SPECIFICATION forming part of Letters Patent No. 534,295, dated February 19, 1895.

Application filed June 27, 1888. Serial No. 278,315. (Specimens.)

*To all whom it may concern:*

Be it known that I, JULIUS J. SUCKERT, of Ridgewood, Bergen county, New Jersey, have invented a new and useful Improvement in Processes of Purifying Hydrocarbon Oils, of which the following is a full, true, and exact description, reference being had to the accompanying drawing.

It is well-known that many attempts have been made to purify and especially to desulphurize hydrocarbon oils, and more particularly those known as the Ohio and Canadian oils containing a considerable percentage of sulphur compounds.

I have devised a process applicable to the treatment of hydrocarbon oils and particularly adapted to petroleums, and among petroleums more especially applicable for the treatment of those containing sulphur, though valuable for all classes of petroleum oils. I have discovered that these sulphur-containing oils can be practically desulphurized by treating the same simultaneously with high heat and pressure in the presence of the oxygen compounds, of the metals, and the metals themselves. All of these bodies capable of forming sulphur compounds are advantageous to use. I have found practically copper, lead, calcium and iron oxide among the best. By subjecting the oil to heat and pressure in the presence of these bodies, the sulphur passes from the oil and with an insufficient quantity of the oxides, escapes partly as hydrogen sulphide and partly enters into combination with the oxides introduced for the purpose or if sufficient of the oxides are added the entire quantity of sulphur can be combined. I have shown an apparatus applicable to this treatment, though I do not limit my process in any way by the apparatus shown.

The drawing represents an elevation, generally in section, of the general arrangement of my apparatus.

In my drawing A represents a mixing chamber in which I introduce my chemical body and thoroughly mingle it with the oil. The chemical body should be finely ground, if dry, and if in a solution should be in a concentrated form. When solid it is introduced through the hand-hole B. The oil may be introduced through the pipe C, and I may or may not add water through the pipe D, or my chemical body in solution may be introduced therethrough.

E, is a blow-off cock for freeing the apparatus of air in starting.

The chamber A, may be of any suitable form, but as shown it is provided with a propeller F, suitably driven and with a central cylinder G, surrounded with baffle-plates H. The propeller is run so as to drive the liquid down through the center cylinder and up through the surrounding baffle-plates, which are preferably perforated, thereby maintaining a thorough admixture. This mixture is then passed to the force pump J, through suction pipe K, and is thence delivered through the pipe L, or the pipe L',—preferably through the pipe L. Thence it passes through the heating chamber M, and thence through the pipe N, to the coil in furnace O. This coil is heated to the proper temperature, preferably by a metal bath. I have found a lead bath very suitable. Thence through the pipes P P', to the bottom of the vessel R, containing an additional supply of one of the bodies heretofore named, in a solid condition, preferably oxide of iron, oxide of lead, or oxide of copper, thence through the pipe S, the cock 1 being closed, through the pipe S', to the bottom of the chamber M, surrounding the coil, thence through the pipe T, to the still W, connecting with condenser X, where an additional fire may be employed to further distill the treated oil. In some cases I may deliver the oil directly into the settling chamber Y, while its vapors are condensed in the condenser Z. The impurities in the oil in the condition of solid matters remain in the bottom of the chambers Y or W, and can be drawn off in the usual way.

The reducing valve V, is set to hold the pressure in the apparatus at the point desired. Instead of the reducing valve V a throttling-cock can be used, as shown in the pipe leading to the still W. I prefer, however, to use a reducing valve on both sides, but either device is operative; the point being that the heating of the oil with the sulphur-removing body is not at atmospheric pressure but at a high pressure, the escape of the oil being held back by the reducing valve. In the presence of the oxides named, such pressure should be about one hundred and fifty to two hundred pounds to the square inch, and the temperature of the bath, which I have found useful, is between 500° and 600° Fahrenheit. Of course the pressure and heat vary under different circumstances, and the amount of pressure varies with the time of heating, to some extent.

In case of refractory oils which require a longer treatment than one passage through the coil, I close the valve 2 and open the valve 3, returning the treated oil then through the pipe $a$ and the suction pipe K, to the pump. The object of the chamber M, is to utilize the heat of the treated oil in heating the oil to be treated; but if I desire I may dispense with this heating in the chamber M, by closing the valves 4 and 5 and opening the valve 6 in the pipe L'. To the top of the chamber M, I preferably attach an automatic blow-off for gases which may be produced. This may be of any suitable form, but I have shown a vertical condenser $c$ through which cold water flows with a ball $d$ above the same which automatically floats up when a liquid follows the gas. In case the vapor is condensible, it is condensed before reaching the ball $d$, and does not, therefore, escape. Of course this apparatus is entirely non-essential, and an ordinary hand-valve can be utilized. The apparatus should be provided with suitable pressure gages and pyrometers, as shown. By closing the valves 7 and 8 and opening the valve 1, the chamber R, can be dispensed with. Its use depends upon the quality of the oil to be treated. Ordinarily it is not required, but with refractory oils it is advisable to have this additional chemical treatment.

By the apparatus shown it will be observed that but little heat is wasted and practically the first heating is largely utilized in the final distillation. Of course the oil is to be finished in the usual manner if a first-class burning oil is desired. I do not find the presence of water with the oil in this treatment to be markedly beneficial,—its principal use being as a solvent, and the oil will treat very well without the addition of water. By suitable manipulation with this apparatus the oil can be practically entirely freed of its sulphur so as not to respond to a test of boiling with sodium and subsequent treatment with a solution of lead acetate. I have discovered that the treatment with these chemical bodies in an ordinary still under ordinary conditions will not free the oil of its combined sulphur, but that heat, pressure and chemical action combined will accomplish this result. It is obvious that the pressure required should be in excess of the natural pressure of the oil due to the heat, so as to retain the oil in a liquid condition in order to secure the best results.

The amount of desulphurizing material to be added to the oil is, of course, a variable quantity, depending upon the material used and upon the quality of the oil. I have found, however, that about eight per cent. by weight of lead oxide thoroughly mingled with the oil works well, and will suffice to eliminate one per cent. of sulphur.

I do not in this application claim the treatment of oil with the alkalies or alkaline earths of the metals, since the alkalies and alkaline earth metals do not require a super-atmospheric pressure in order to combine with the sulphur of the oil, and their cost is too great to permit of their commercial use, and the results are generally unsatisfactory, whereas the compound of the alkalies and alkaline earth metals require a heat and pressure so great in desulphurizing the oil as to decompose or carbonize a considerable per cent. of this oil, whereas the bodies herein claimed operate satisfactorily at the temperatures and pressures specified.

What I claim as my invention, and desire to secure by Letters Patent, is—

The process of refining hydrocarbon oil, consisting in adding to the same a body described capable of combining with sulphur in the oil, subjecting the mixture to heat and pressure, subsequently relieving said pressure and condensing any vapors arising from the heated oil, substantially as described.

In testimony whereof I have signed my name to this specification in the presence of two subscribing witnesses.

JULIUS J. SUCKERT.

Witnesses:
ANTHONY GREF,
WM. A. POLLOCK.